United States Patent [19]
Karttunen

[11] Patent Number: 5,950,184
[45] Date of Patent: *Sep. 7, 1999

[54] INDEXING A DATABASE BY FINITE-STATE TRANSDUCER

[75] Inventor: Lauri J. Karttunen, Meylan, France

[73] Assignee: Xerox Corporation, Stamford, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/746,684

[22] Filed: Nov. 14, 1996

[30] Foreign Application Priority Data

Nov. 23, 1995 [GB] United Kingdom ................ 95 241 36

[51] Int. Cl.⁶ ........................................................ G06F 17/30
[52] U.S. Cl. .............................................. 707/1; 707/100
[58] Field of Search ..................................... 707/1, 2, 100

[56] References Cited

U.S. PATENT DOCUMENTS

| | | | |
|---|---|---|---|
| 4,285,049 | 8/1981 | Bird et al. ............................... | 711/156 |
| 5,278,981 | 1/1994 | Kawaguchi et al. ...................... | 707/6 |
| 5,369,577 | 11/1994 | Kadashevich et al. .................... | 704/9 |
| 5,388,234 | 2/1995 | Kanno et al. ............................ | 711/220 |
| 5,452,451 | 9/1995 | Akizawa et al. ........................ | 707/6 |
| 5,519,857 | 5/1996 | Kato et al. ................................ | 707/5 |
| 5,551,026 | 8/1996 | Kaplan et al. ........................... | 707/100 |
| 5,553,283 | 9/1996 | Kaplan et al. ........................... | 707/101 |
| 5,594,641 | 1/1997 | Kaplan et al. ........................... | 707/532 |
| 5,625,554 | 4/1997 | Cutting et al. .......................... | 707/100 |
| 5,642,522 | 6/1997 | Zaenen et al. ........................... | 707/532 |
| 5,680,511 | 10/1997 | Baker et al. ............................. | 1/1 |
| 5,754,847 | 5/1998 | Kaplan et al. ........................... | 707/100 |

FOREIGN PATENT DOCUMENTS

| | | |
|---|---|---|
| 0 583 083 A2 | 2/1994 | European Pat. Off. . |
| 0 649 105 A1 | 4/1995 | European Pat. Off. . |

OTHER PUBLICATIONS

Lucchesi, C.L. et al. "Applications of Finite Automata Representing Large Vocabularies." *Software—Practice and Experience*, vol. 23(1), Jan. 1993, pp. 15–30

*Primary Examiner*—Maria N. Von Buhr

[57] ABSTRACT

A technique of using the path numbers of an acyclic finite-state transducer as a method of indexing a database. Each entry in the database has associated therewith one or more keys. A finite state transducer is provided defining the keys for the database. For each key, a path number is determined associated with that key, the path number defining a mapping between that key and the (or each) corresponding entry in the database.

19 Claims, 6 Drawing Sheets

INDEXING A DATABASE BY FINITE-STATE TRANSDUCER

BACKGROUND OF THE INVENTION

The present invention relates to data processing, and more particularly to a technique of indexing a database using the path numbers of an acyclic finite-state transducer (FST).

In the following, an index refers to a device that associates alphanumeric keys with one or more addresses in a database. If the database is a physical object, such as a book the index might be a list of pairs consisting of a keyword or a phrase and a list of numbers identifying the pages where the word or phrase appears in the book. If the database is an electronic document, such as a machine readable dictionary, the index might be a list of pairs that consist of a headword of a dictionary entry as a key, and a list of locations in a computer file or in the memory of the computer where the entry is stored.

For a computerised index, it is important to have an efficient method of computing the address corresponding to a key. The construction of a hash table is a well known way to achieve this purpose. It involves (a) selecting a function that assigns to each key some random numerical value in a chosen range and (b) storing the address associated with the key in the corresponding location in the hash table. The standard hashing method can be suboptimal in two ways: (1) the hash function may assign the same value to more than one key, and (2) some values are not assigned to any key at all. Because of (1), the address must be marked in some way to make it possible to determine which key they belong to; and (2) means that the hash table may be partially empty. If (1) or (2) holds, some space, and possibly search time, is wasted.

Word/number mapping

Both of the aforementioned problems can be avoided by finding a hash function that assigns to each key a unique value in a range that exactly matches the size of the hash table. This guarantees that every position in the table is filled with one and only one address; thus, it is not necessary to mark which key each address belongs to.

A perfect hash function of this type can be obtained by constructing a deterministic finite-state automaton that enumerates the keys. C. L. Lucchesi and T. Kowaltowski ("Applications of Finite Automata Representing Large Vocabularies", *Software Practice and Experience*, Vol. 23(1), pp. 15–30, January 1993) describe an algorithm that associates a unique number with every word accepted by a deterministic finite-state automaton. The numbers range from 0 to n−1, where n is the number of words accepted by the automaton. Because the size of the hash table can be the same as the number of keys, no space is wasted.

However, in some cases of database access even such a perfect hash function is not appropriate because (1) it assigns, by definition, to each key exactly one value and because (2) every value is associated with only one key. There are databases and applications for which neither (1) nor (2) is desirable. An example of that kind is an online dictionary. To illustrate a case in which it is desirable to provide multiple values for some keys, in the following description we will consider a simple example: searching for the location of the entry for the word "do" in an English dictionary.

Published European patent application EP-A-649,105 discloses a technique in which a stored word list can be used for word-to-number (W/N) and number-to-word (N/W) mapping. Each word in the list can be mapped to a unique number within a dense set of numbers ranging from zero to one less than the total number of words in the list. Some branches of the data structure can be skipped during mapping because of branching information associated with branch points. The branching information permits mapping to continue with a next branch or with an alternative branch. The branching information indicates the number of suffix endings in the next branch; this number is used to keep a count of the word endings during W/N mapping; it is also used both to determine whether to continue with the next branch and also to reduce the number being mapped during N/W mapping. The branching information can include a full length pointer to the next branch or a shorter length pointer index to a table in which the full length pointer is stored. In either case, the number of suffix endings in the next branch can be annexed to the pointer. Where sublists of words have identical suffixes, the suffixes can be collapsed into shared branches.

A typical dictionary does not provide a unique headword for each entry. Many words, including "do", appear as a headword in several entries. There is one entry for "do" in the sense of an activity, another entry for "do" as a note on a musical scale. Consequently, the query for the address of "do" should yield multiple answers: one for each entry with "do" as the headword.

The previous example assumes that user does not know in advance that "do" can be both a verb and a noun. But this is not necessarily true. In a sentence like "I want to do something," the occurrence of "do" can be easily identified as a verb. In this context, only the entry or entries concerned with the verb sense of "do" are relevant. The user should be able to narrow the query, say, to "do+V", thereby receiving only a pointer to the verb entry of "do" as the answer. (We use the symbol "+V" to refer to verbs, "+N" for nouns.)

SUMMARY OF THE INVENTION

The present invention solves problems of this type while retaining the advantages of the Lucchesi-Kowaltowski perfect hash function. The essence is to index a database by means of a finite-state transducer.

The present invention provides a method of indexing a database, each entry in the database having associated therewith one or more keys, comprising: (a) providing a finite-state transducer defining the keys for the database; (b) for each key, determining a path number associated with that key, said path number defining a mapping between that key and the or each corresponding entry in the database.

The invention further provides a method of retrieving an entry in a database, the database having been indexed according to the above-mentioned method, comprising: (d) receiving a key input by a user; (e) determining the or each path number associated with the key; and (f) retrieving the entry corresponding to the or each path number determined in step (e).

In each case, the database preferably comprises an electronic dictionary, and the or each said key comprises a headword in the dictionary, a headword associated with an additional marker or markers, such as a part-of-speech tag, sense number target language indicator, or any other characteristic that may be used to distinguish among different types of information associated with the same headword.

In step (d), the input key may include an indication as to whether it is an upper-side (L1) or lower-side (L2) word. Step (e) may include the step (e1) of matching the input key against the corresponding side word of the transducer.

The invention further provides a programmable data processing apparatus when suitably programmed for carrying out the method of any of the appended claims.

The invention uses the path numbers of an acyclic finite-state transducer as a method of indexing a database. The use of a transducer rather than a simple network makes it possible to associate a search key with multiple values and vice versa. We assume in the following that the mapping is done in a non-redundant fashion. That is, the symbols of the L1 word are associated with the symbols of the L2 word from left to right, padding the shorter string, if necessary, with epsilon symbols at the end to make the words be of equal length. Although any word in L1 and L2 may appear on several paths of the transducer, for any pair of words from L1 and L2 that are mapped to each other, there is a unique path through the network. Thus it is possible to assign a unique index (number) to every pair of words in the relation.

FIG. 1 presents a simple example of a finite-state transducer used to describe the invention. The network in FIG. 1 encodes the relation R shown in Table 1.

TABLE 1

L1 = {cab, can + N, can + V, do + N, do + V, dud}
L2 = {cab, can, do, dud}
R = {<cab, cab>, <can + N, can>, <can + V, can>, <do + N, do>, <do + V, do>, <dud, dud>} to assign the same value to multiple keys while retaining all the advantages of word-number mapping (as disclosed in the above-mentioned EP-A-649,105 and Lucchesi and Kowaltowski references). This flexibility is important for applications such as the accessing of entries in an electronic dictionary.

Embodiments of the invention will now be described, by way of example, with reference to the accompanying drawings.

DETAILED DESCRIPTION

As will be apparent to persons skilled in the art, the present invention may be implemented by means of a suitably programmed conventional computer, such as, for example, a minicomputer running Unix®, or a PC running DOS®/Windows™. The details of such hardware are given at the end of this disclosure, with reference to FIG. 7.

Assigning Number to Keywords with a Transducer

Figure 1:
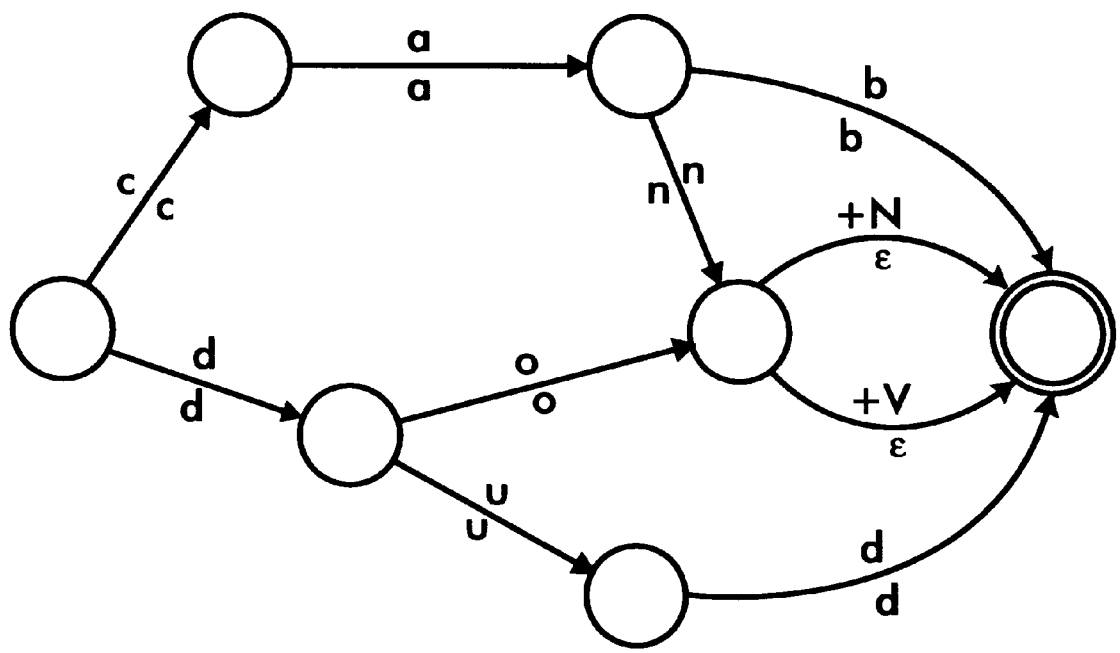
FIG. 1 shows a simple example of a finite-state transducer used to describe the invention.

A finite-state transducer is a network of states and arcs that defines a relation between two regular languages L1 and L2. Each word in L1 is mapped to one or more words in L2, Each pair in the relation R in Table 1 is represented in the network of FIG. 1 by a path of arcs that leads from the initial state on the left to the final state (marked with a double circle) on the right. The arcs are labelled by a pair of symbols, the upper member is a symbol from the alphabet of L1, the lower member a symbol from the alphabet of L2. One of the two symbols may be the special null symbol ε (=epsilon). The pair <do+V, do> for example, corresponds to the path shown in FIG. 2.

Figure 2:
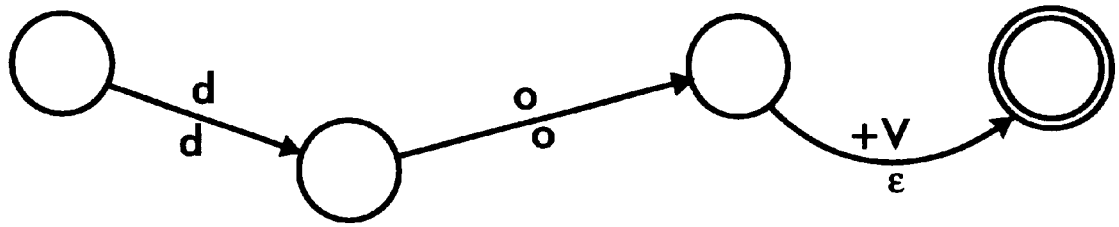
FIG. 2 illustrates the path for the pair <do+V,do> in FIG. 1.

With the transducer in FIG. 1, any L2 word, such as "do", can be mapped to its counterparts in L1, "do+N" and "do+V" by finding all paths such as the one in FIG. 2 that have the symbol sequence of the L2 word, "d" "o" in this case, on the lower side, possibly followed by epsilons. The corresponding L1 word is represented by the symbol sequence on the upper side, ignoring trailing epsilons. The procedure for mapping an L1 word to its counterparts in L2 is exactly the same except that the upper side of the arc labels is used in the match and the output is produced from the lower side.

The simple method of finding the paths that represent an L1 or L2 word can be augmented to associate each path with a unique number.

Figure 3:
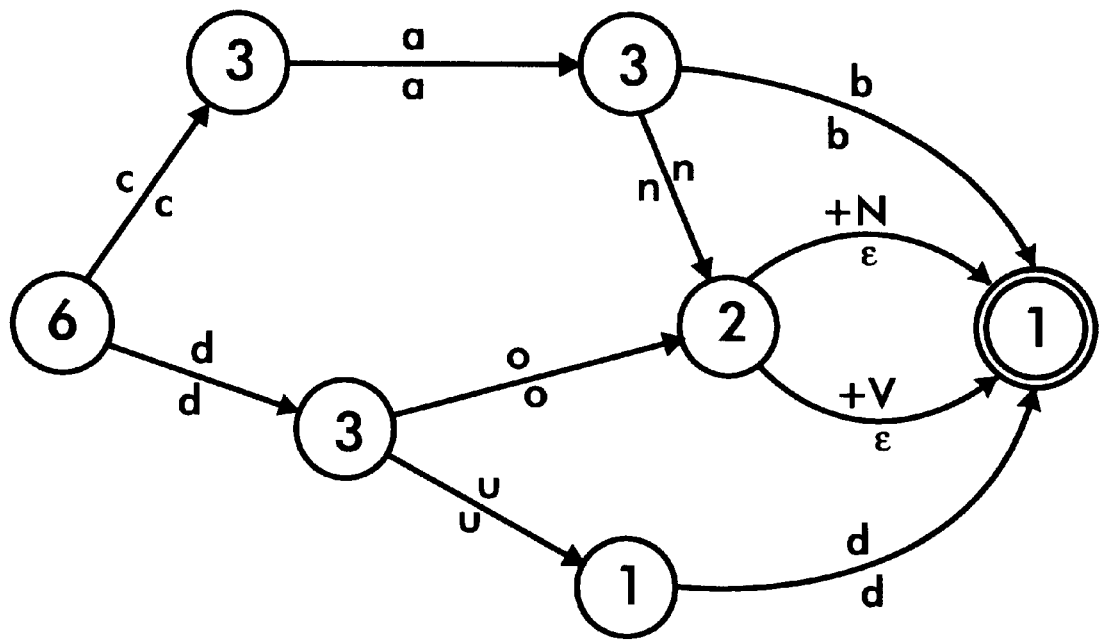
FIG. 3 shows the network of FIG. 1 after the numbers have been determined for each state therein.

As a preliminary step, in each state of the network is recorded the number of paths from that state to a final state. The result is displayed in FIG. 3. The number recorded in each state is equal to the sum of numbers at the destination states of the arcs that lead away from the state (plus 1 if the state is final).

Figure 4:
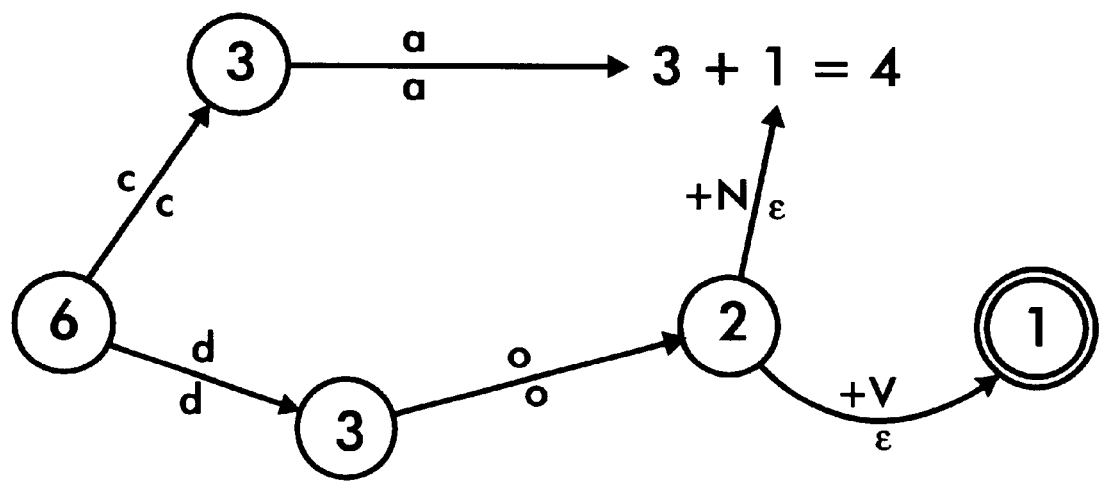
FIG. 4 illustrates the calculation that assigns to one of the paths in FIG. 3 a path number.

The computation of the path numbers is based on the ordering of the outgoing arcs and the numbers at the destination states of those arcs. At the initial state, the path number is zero. If the chosen arc is not the first (=topmost) arc of the state where it originates, the path number is increased by the destination numbers of all the earlier arcs. The number of a given path can thus be determined simply by computing the sum of the destination numbers of all the arcs that precede the selected arc in each state along the path. FIG. 4 illustrates the calculation that assigns to the path in FIG. 2 the number 4. Note that the L2 word "do" is associated with two paths in the network in FIG. 3, path 4 and path 3, whereas the L1 word "do+V" has a unique number, 4, in the network since it only appears on the path shown in FIGS. 2 and 4.

In an application that lets the user to access a database to obtain information about the words in the network, the addresses of the two entries for "do" would be stored in cells 3 and 4 of a six cell matrix associated with the network. A query that uses the lower side of the network to access the data returns pointers for two entries for "do" and "can", and to single entries for "cab" and "dud". The upper side of the network allows the use to access the database by specifying a headword and a part of speech.

Application: Indexing an Electronic Dictionary

Figure 5:
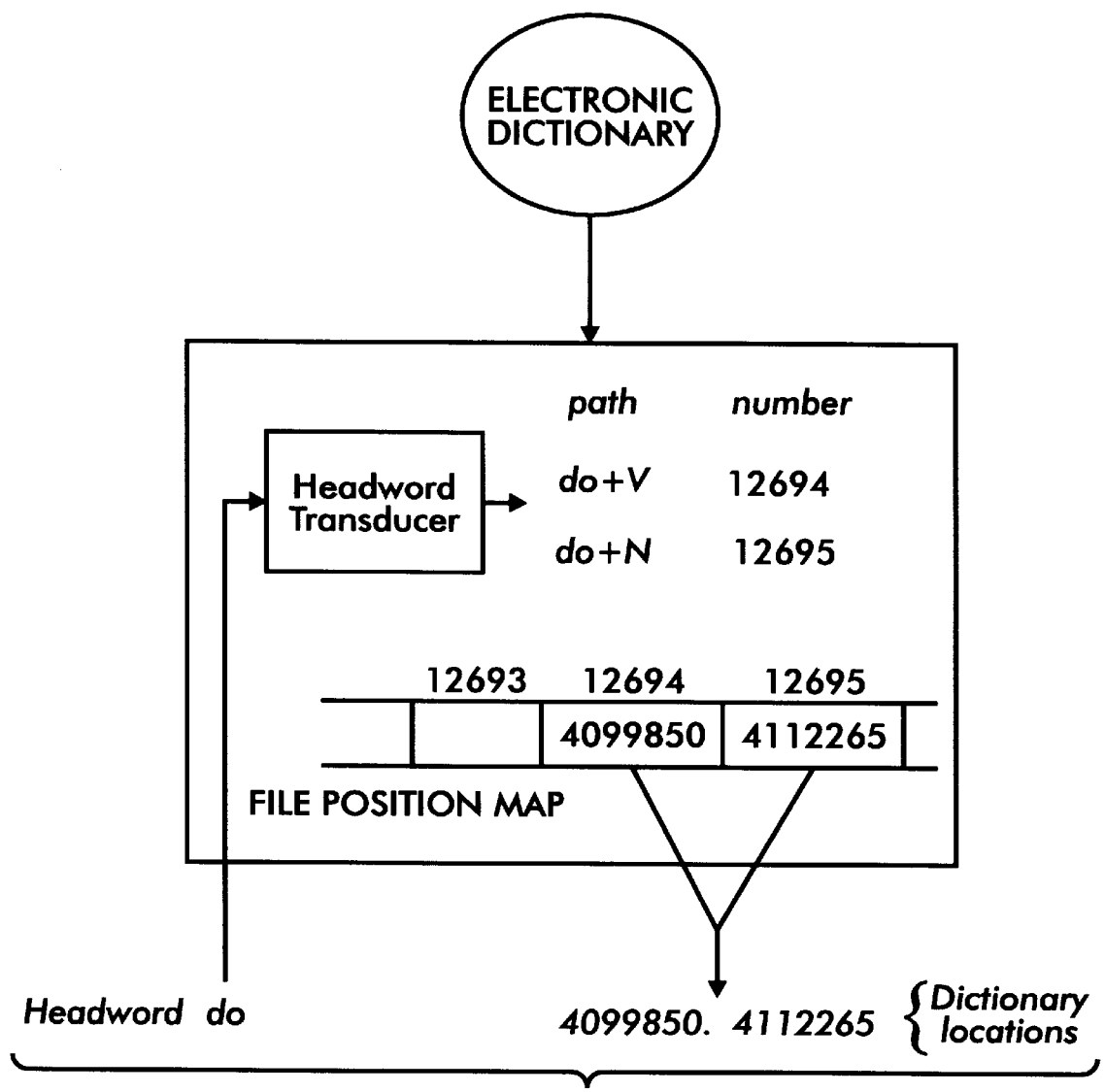
FIG. 5 shows a general outline of a server used to implement the invention with an electronic dictionary.

The method has been implemented to provide access to online electronic dictionaries for English and French, each containing about 40K entries. FIG. 5 gives a general outline of the dictionary server. When the server is launched, it reads the online dictionary (a 17 MB text file) and constructs two data structures: a headword transducer of the type described in the preceding section and a file position map that stores the addresses of all the entries in the dictionary. The client application can send two types of queries: (1) just a headword or (2) headword and a part-of-speech indicator (e.g., "+V", "+N"). The server computes the path number or numbers associated with the input and returns the corresponding address or addresses in the file position map.

Figure 6A:
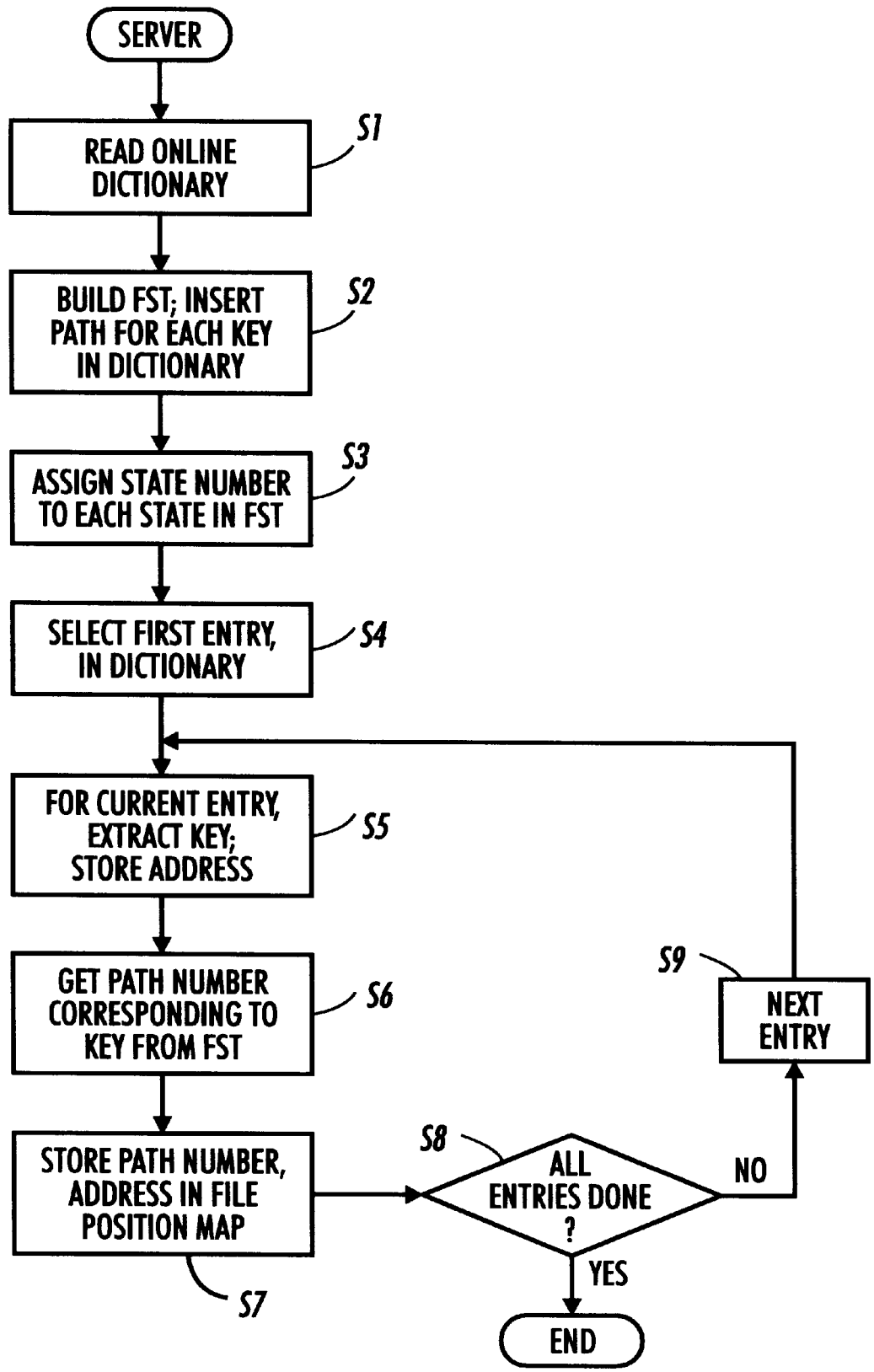
FIGS. 6(a) and 6(b) present schematic flow diagrams of the processes used to implement the invention on a conventional computer.
Figure 6B:
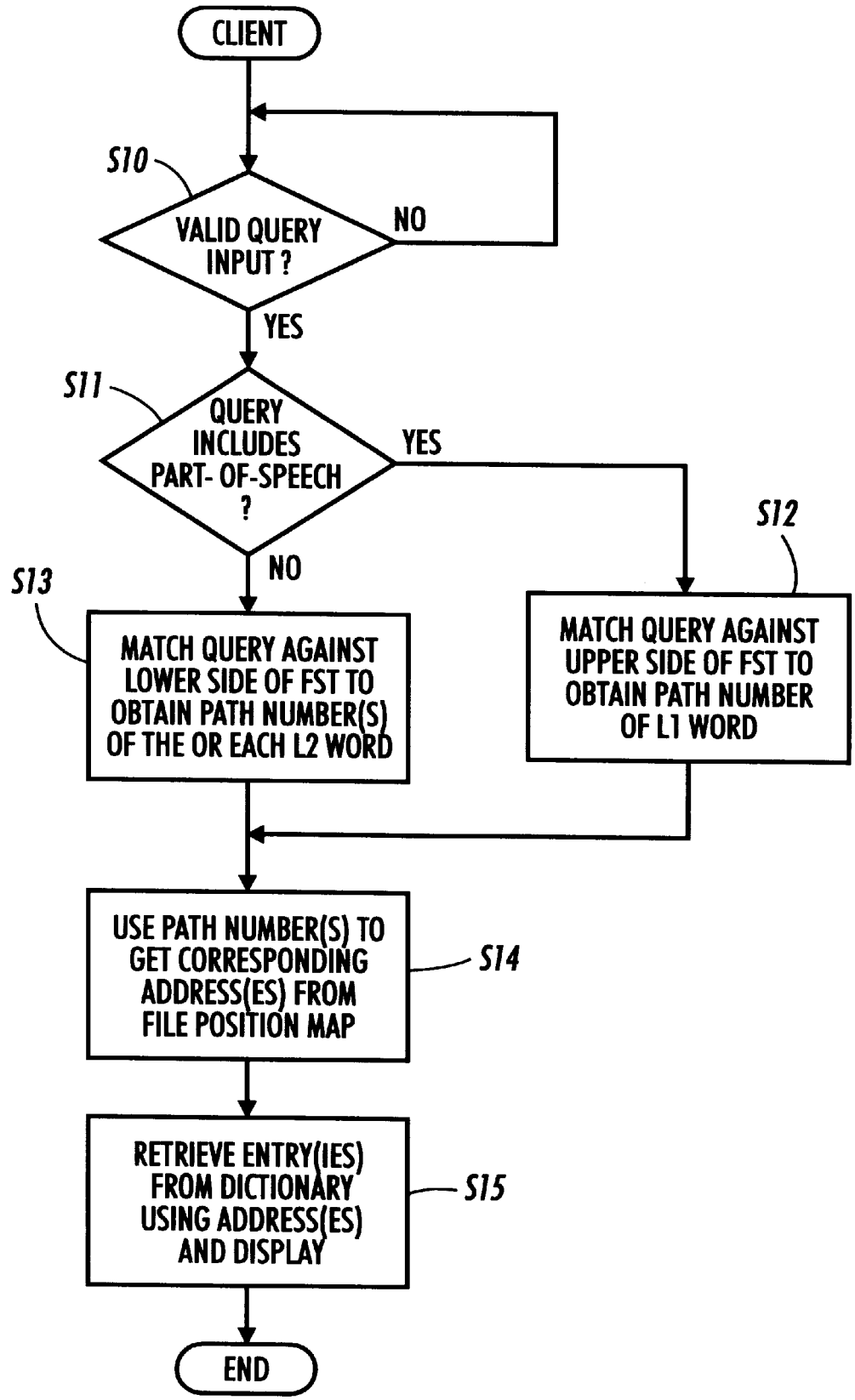

FIG. 6(a) shows a schematic flow diagram of the process used by the server and FIG. 6(b) shows a schematic flow diagram of the process used by the client, to implement on a conventional computer the embodiment of the present invention mentioned in the preceding discussion.

Referring to FIG. 6(a), the online dictionary is initially read from storage (step s1). Then, the finite-state transducer is constructed as discussed above, with one path being provided for each entry in the dictionary (step s2).

A routine for assigning a state number to each state in the FST is performed at step s3. To each state is assigned a number indicating the number of paths from that state to a final state. This process is recursive and starts from the initial (leftmost) state. Initially, a preliminary pass is made through the transducer setting all state numbers to zero. Then, the following recursive routine is called on the initial state of the network. (This routine presupposes that the network is acyclic.) Assume here that STATE.number refers to the number associated with the state (initially 0); and STATE.final is a flag that indicates whether the state is a final state. A state consists of a number of arcs departing therefrom. Each arc has a label (not needed here) and a destination state. ARC.destination refers to the destination state of the arc.

```
assign_state_number(STATE)
    if STATE.number = 0
    then
        if STATE.final = TRUE
            STATE.number = 1;
        for all ARC in STATE
            STATE.number = STATE.number +
                assign_state_number(ARC.destination);
    return STATE.number
```

When the routine is called on the initial state of the network, it checks if the state number is zero. If it is not zero, the state has already been processed and the function simply returns the previously computed value. If the state has not been processed, i.e. if the state number is still zero, there is work to be done. If the state is a final state, STATE.number is set to 1, otherwise it remains 0. In the next step, the routine calls itself on the destination states of all the arcs leaving the state in question and increments the STATE.number with the values returned by these function calls. Finally, the computed value is returned.

Subsequently, a file position map is constructed. At step s4, the first entry in the dictionary is fetched. The key (i.e. headword in the dictionary) for the current entry is extracted at step s5, and the corresponding address in the dictionary stored. Next, at step s6, using the key as an L1 word, the path number for the key is obtained from the FST. The path number and corresponding dictionary address are then stored in the file position map at step s7. A check is made at step s8 as to whether the path number and address for all entries in the dictionary have been stored. If not, the process increments to the next entry (step s9) and returns to step s5, otherwise the process is concluded.

The process for retrieving an entry in response to an input query is illustrated in FIG. 6(b). First a check is made that a valid query input has been received (step s10); for example, non-character inputs may be ignored. Then, suitably by extracting the final string portion of the input query and comparing it with a list of possibilities (e.g., "+V", "+N"), it is determined (step s11) whether the input includes a part of speech indicator. If it does, the query is matched at step s12 against the upper side (L1 words) of the FST in order to obtain the corresponding path number in the FST.

If the input query does not include a part of speech indicator, the query is matched at step s13 against the lower side (L2 words) of the FST to obtain the path number or numbers for each possible path through the FST. In the example discussed earlier, this returns paths numbers 4 and 3 for the input word "do", corresponding to the paths for "do+V" and "do+N", respectively, in L1.

Next, the path numbers thus obtained are used to extract (step s14) the corresponding address(es) from the file position map (see FIG. 5). Thereafter the entries at those address(es) are retrieved and displayed (step s15). It will be appreciated that if the input query gives rise to no valid address from the FST, a suitable message may be displayed to the effect that no entry exists for the query word entered.

The above-described transducer method of indexing a database has potential applications in many other domains besides the simple example given here. It can also be extended from simple transducers to automata that encode n-level relations, thus providing any number of ways to efficiently access a database.

Figure 7:
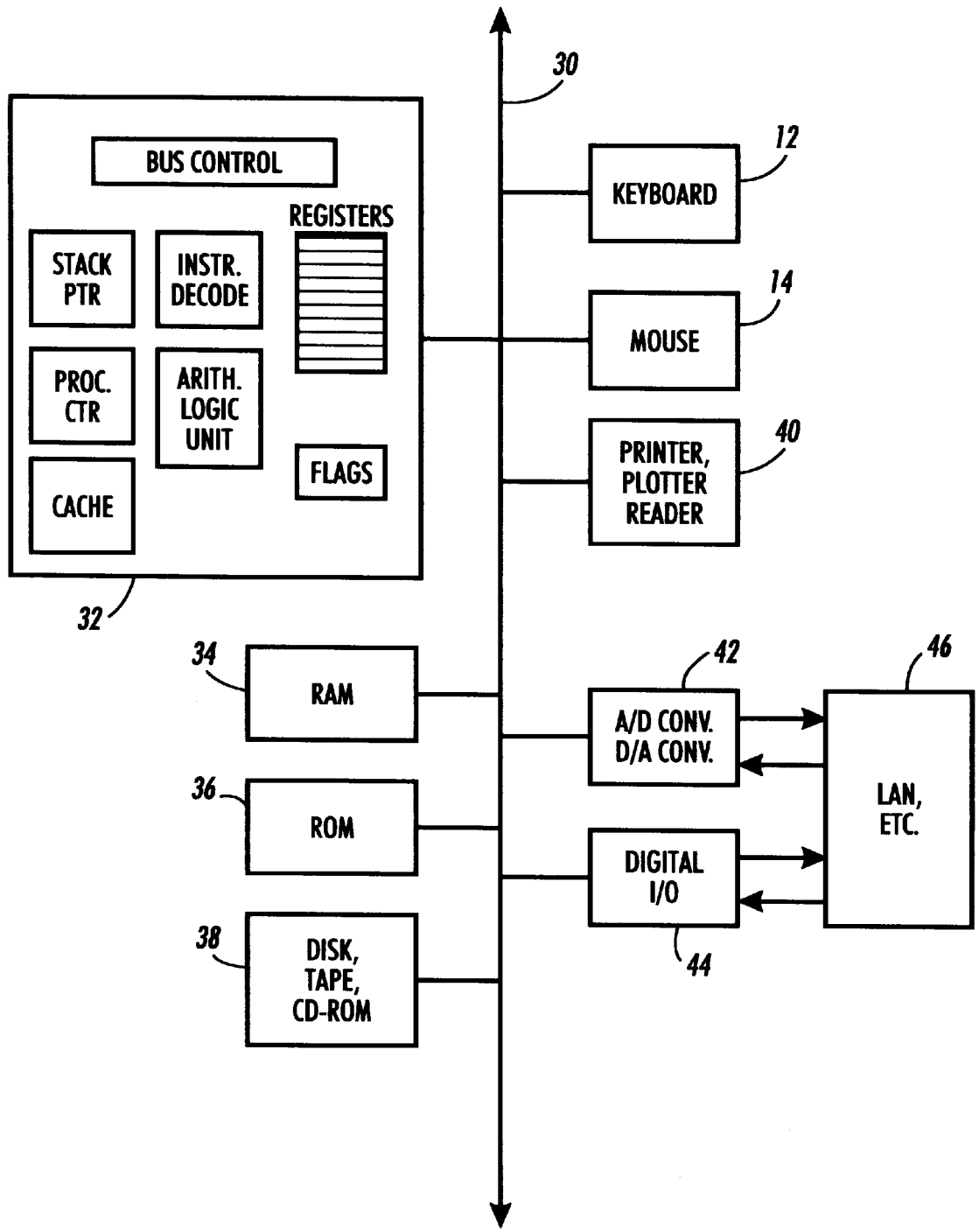
FIG. 7 is a schematic block diagram of a computer which may be used to implement the present invention.

FIG. 7 shows schematically the hardware of the computer employed in accordance with one preferred embodiment of the invention. The configuration is well known to persons skilled in the art and is described in detail in, for example, *The Art of Electronics,* 2nd Ed., Ch. 10, P. Horowitz and W. Hill, Cambridge University Press, 1989. Stated briefly, the system comprises, connected to common bus 30, a central processing unit 32, memory devices including random access memory (RAM) 34, read only memory (ROM) 36 and disk, tape or CD-ROM drives 38, keyboard 12, mouse 14, printing, plotting or scanning devices 40, and A/D, D/A devices 42 and digital input/output devices 44 providing interfacing to external devices 46. The computer may be equipped with a conventional internal driver card (not shown) and appropriate software (such as Netware™, available from Novell Corp.) enable the computer to form part of a local area network (LAN), as is well known in the art. Further, the computer can be connected to a wide area network (WAN), such as the Internet.

As will also be appreciated by those of skill in the art, the computer can carry out the method of the invention, or various portions or aspects thereof, by executing one or more appropriate software programs with central processing unit 32. The executable software program can be accessed by central processing unit 32 from storage in RAM 34, ROM 36, or disk, tape, or CD-ROM drives 38, or any combination of these, or remotely as from a network server. In executing the software program or programs, the central processing unit 32 has access to the database, which can be stored, for example, in RAM 34 and disk, tape or CD-ROM drives 38, or remotely on a network server.

The foregoing description illustrates just some of the uses and embodiments of the invention, and many others are possible. Accordingly, the scope of the invention is not limited by the description, but instead is given by the appended claims and their full range of equivalents.

The claimed invention is:

1. A method of indexing a database, each entry in the database having associated therewith one or more keys, said method comprising the steps of:
   (a) providing a finite-state transducer defining the keys for the database, each state in said finite-state transducer having an associated state number;
   (b) generating a path number for each key using said finite-state transducer, said path number based solely on said associated state number for states in said finite-state transducer, said path number defining a mapping between that key and the or each corresponding entry in the database.

2. The method of claim 1, further comprising the step (c) of generating a file position map defining the address, in the database, of each of said entries, and wherein each entry in said file position map is associated with one of said path numbers.

3. The method of claim 1, wherein step (a) further comprises:
   for each state in the finite-state transducer, associating said state number with that state, said state number preferably equating to the number of paths of any length (Including zero) from that state to a final state.

4. The method of claim 3, wherein step (b) further comprises:
   (b1) for each path in the finite state transducer, determining a path number, associated with that path, as a function of the state numbers of the states along that path.

5. The method of claim 1, wherein step (b) further comprises:
   (b1) generating a mapping of each path number to the address of the or each corresponding entry in the database.

6. The method of claim 1, wherein said database comprises an electronic dictionary.

7. The method of claim 6, wherein the or each said key comprises a headword in the dictionary.

8. The method of claim 7 in which the headword of the or each said key is a headword associated with an additional marker or markers.

9. The method of claim 8 wherein at least one additional marker is selected from the group consisting of a part-of-speech tag, a sense number, and a target language indicator.

10. A method of retrieving an entry in a database comprising the steps of:
    indexing said database by performing the steps of:
      (a) providing a finite-state transducer defining the keys for the database, each state in said finite-state transducer having an associated state number;
      (b) for each key, determining a path number associated with that key using said finite state transducer, said path number based solely on said associated state number for states in said finite-state transducer, and said path number defining a mapping between that key and the or each corresponding entry in the database;
      (c) generating a file position map defining the address, in the database, of each of said entries, each of said addresses in said file position map associated with one of said path numbers;
    retrieving said entry by performing the steps of:
      (d) receiving a key input by a user;
      (e) determining the or each path number associated with the key using said finite state transducer; and
      (f) retrieving the entry corresponding to the or each path number determined in step (e).

11. The method of claim 10, wherein step (f) further comprises the substep of obtaining, for the or each path number determined in step (e), a corresponding address in said file position map.

12. The method of claim 11, wherein step (f) further comprises the substep of retrieving the database entry at the or each address obtained from said file position map.

13. The method of claim 10, wherein said database comprises an electronic dictionary.

14. An article of manufacture comprising:
    a program storage device readable by a machine, tangibly embodying a program of instructions executable by the machine to perform method steps for creating an index for a database, said method steps comprising:
      (a) providing a finite-state transducer defining the keys for the database, each state in said finite-state transducer having an associated state number;
      (b) generating a path number for each key using said finite-state transducer, said path number based solely on said associated state number for states in said finite-state transducer, said path number defining a mapping between that key and the or each corresponding entry in the database.

15. The article of manufacture as recited in claim 14, wherein said method steps are further for retrieving an entry in said database, said method steps further comprising:
    (d) receiving a key input by a user;
    (e) determine the or each path number associated the key using said finite state transducer; and
    (f) retrieving the entry corresponding to the or each path number determined in step (e).

16. An apparatus comprising a processor, a memory device operatively coupled to the processor, and means for indexing a database, each entry in the database having associated therewith one or more keys, by:
(a) providing a finite-state transducer defining the keys for the database, each state in said finite-state transducer having an associated state number;
(b) generating a path number for each key using said finite-state transducer, said path number based solely on said associated state number for states in said finite-state transducer, said path number defining a mapping between that key and the or each corresponding entry in the database.

17. The apparatus of claim 16 wherein the indexing means comprises a software program executable by the processor, the program being stored at least partially in the memory device.

18. The apparatus of claim 16 further comprising:
means for retrieving an entry from a database by:
(d) receiving a key input from the input device;
(e) determining the or each path number associated with the key; and
(f) retrieving the entry corresponding to the or each path number thus determined.

19. The apparatus of claim 18 wherein the entry-retrieving means comprises a software program executable by the processor, the program being stored at least partially in the memory device.

* * * * *